United States Patent Office 3,666,408
Patented May 30, 1972

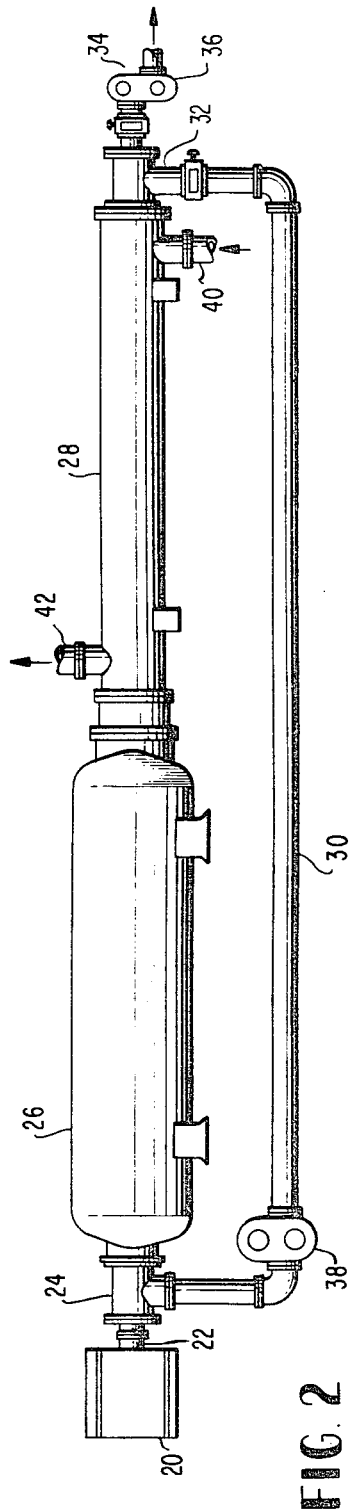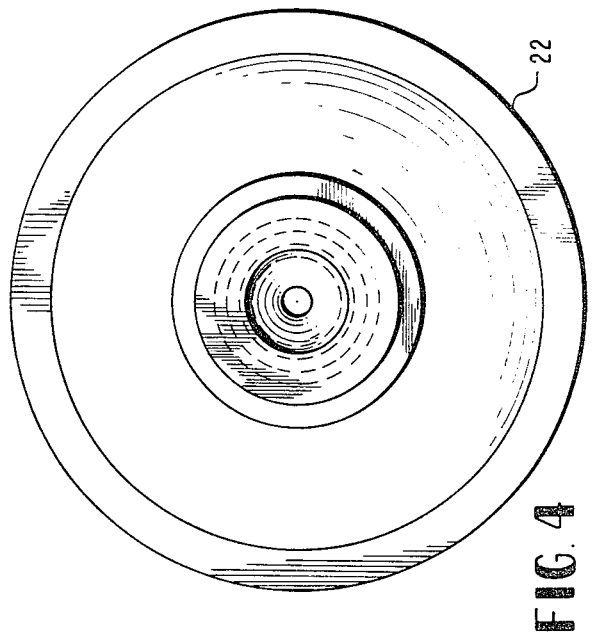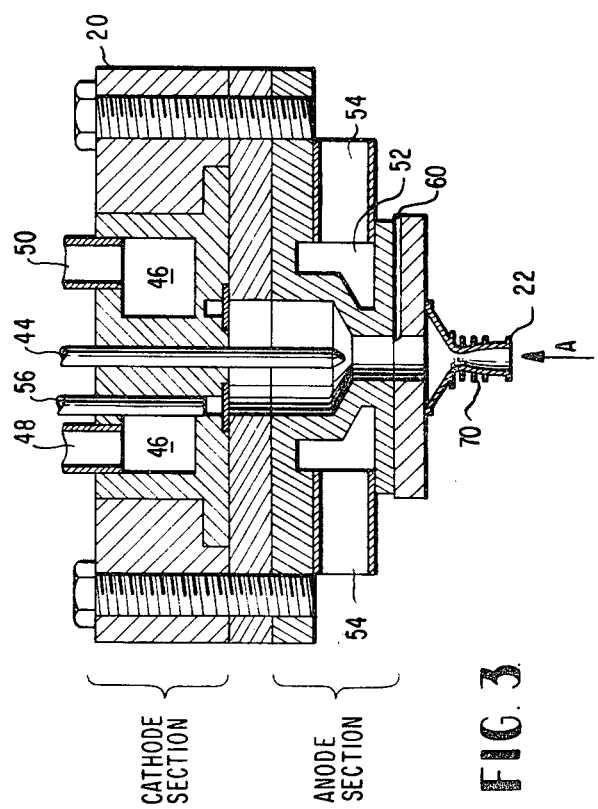

3,666,408
PROCESS FOR THE PRODUCTION OF OXIDES OF NITROGEN
Aristid V. Grosse, 456 Glyn Wynn Road, Haverford, Pa. 19041; Charles S. Stokes, 127 Madison Road, Willow Grove, Pa. 19090; and Edward W. Smith, 402 Longwood Drive, Exton, Pa. 19341
Continuation-in-part of application Ser. No. 805,069, Dec. 27, 1968, which is a continuation-in-part of application Ser. No. 639,880, May 19, 1967. This application Feb. 16, 1970, Ser. No. 11,474
Int. Cl. C01b 21/30
U.S. Cl. 23—163                    2 Claims

ABSTRACT OF THE DISCLOSURE

An improved process for producing oxides of nitrogen such as nitric oxide which includes (a) reacting nitrogen plasma with oxygen plasma, the plasma having been formed by an electric arc discharge, and (b) cooling the resulting gaseous reaction mixture from the plasma state to a temperature below the dissociation temperature of nitric oxide by (1) expanding the gaseous mixture at an expansion ratio in the range of from 30:1 to 200:1, the expansion beginning prior to the loss of the plasma state, and (2) contacting the expanded reaction mixture with cooler recycle gas.

RELATED APPLICATIONS

This application is a continuation-in-part of application Ser. No. 805,069, now abandoned, filed Dec. 27, 1968, which is assigned to the assignee of the present invention, and which in turn is a continuation-in-part of now abandoned application Ser. No. 639,880, filed May 19, 1967, which is also assigned to the assignee of the present invention.

BACKGROUND OF THE INVENTION

Field of the invention

The present invention relates to an improved process for the production of oxides of nitrogen such as nitric oxide and nitrogen dioxide. More particularly, the present invention relates to the production of nitric oxide by reacting nitrogen with oxygen while each are in the plasma state and substantially instantaneously cooling the resulting gaseous reaction mixture from the plasma state to below the dissociation temperature of nitric oxide, for example, to below 1000° C.

SUMMARY OF THE PRIOR ART

It has previously been disclosed that nitric oxide may be produced by subjecting a gaseous stream of nitrogen to an electric arc discharge to produce a nitrogen plasma, which is then contacted with oxygen to yield nitric oxide. Plasma, which is formed by passing a gas such as nitrogen in contact with or through an electric arc, comprises highly reactive species such as ions, electrons and neutral fragmented particles, all of which are in highly excited states. Upon contacting the plasma of nitrogen with oxygen, at least a portion of the oxygen is also converted to plasma. The oxygen and nitrogen react in the plasma state to form a nitric oxide-containing reaction mixture.

In order to recover nitric oxide, the resulting gaseous reaction mixture must first be cooled from a temperature in the range of from about 4000 to 49,000° C., the normal temperature range of a plasma, to essentially room temperature, whereby conventional nitric oxide recovery schemes may be employed.

Heretofore, techniques involving expansion of the reactants through a de Laval nozzle, quenching by contact with a cooled surface or by injection of a cold inert medium, or combinations of the above, have been suggested to cool gaseous reaction products in general from plasma jet to ambient conditions. See, for example, I & EC Fundamentals, vol. 1, No. 1, pp. 53–54 (February 1962). However, since de Laval nozzles convert thermal energy to kinetic energy, some device for abstracting the kinetic energy from the gaseous product to prevent its reheating must be used. Turbines followed by conventional liquid spray techniques have been suggested as ideal for this purpose, but in nitrogen-oxygen plasma jet processes a turbine would have to be capable of handling very large total amounts of thermal and kinetic energy and a liquid spray would cause undesired dilution and contamination of the product which would then have to be further treated to remove the liquid. As to the suggested quenching by contact with a cooled surface or by injection of a cold inert medium, the former may cause undesired shock waves to occur which in turn cause the dissociation of nitric oxide thereby reducing the yield, and the latter causes dilution and contamination of the product which again requires further treatment to remove the inert medium. Likewise, combinations of the above methods may give a combination of the associated disadvantages.

Techniques such as a pebble bed heat exchanger in combination with a water spray cooling tower and recycled product gas have been suggested to reduce the temperature of reaction products from a thermal nitric oxide process which uses a gas-fired reactor or furnace. See, for example, Canadian Pat. 497,512, issued Nov. 10, 1953. As described therein, these thermal processes use a recycled gas, preheated to at least 2300° F. (about 1200° C.) to prevent too much cooling, and obtain yields of nitric oxide of about 2 to 6 percent. This is in comparison with the above mentioned prior art plasma processes which give yields of nitric oxide of about 2 to 4 weight percent based on the total weight of nitrogen introduced into the plasma generator, with the calculated theoretical equilibrium yield being up to about 8 weight percent nitric oxide for a plasma generator operating at about 1.0 atm. pressure.

As a result of the present invention, yields of nitric oxide more than twice the calculated theoretical equilibrium values may be obtained without incurring the above discussed disadvantages of the prior art.

SUMMARY OF THE INVENTION

Accordingly, the primary object of the present invention is to provide an improved electric arc plasma generator process for the production of oxides of nitrogen, and particularly nitric oxide. Other objects will be apparent from the following:

In accordance with the present invention, nitrogen plasma is reacted with oxygen plasma, the plasma having been formed via an electric arc discharge, and the resulting gaseous reaction mixture is cooled from the plasma state, that is, where at least a portion of the initial reaction mixture is in the form of plasma, to below the dissociation temperature of nitric oxide. The cooling is effected by expanding the gaseous reaction mixture at an expansion ratio in the range of from 30:1 to 200:1, the expansion beginning while at least a portion of the gaseous reaction mixture is still in the plasma state, and then contacting the expanded reaction mixture with cooler recycle gas.

In order to obtain the unexpectedly high yields it has been found that oxygen plasma and nitrogen plasma must be reacted together, that is, while at least a portion of each reactant gas is in the form of plasma or in the plasma state, wherein the highly reactive species such as ions, electrons and the like are present. In addition, however, it has been found that the plasma must be formed by the heat generated in an electric arc discharge in contrast to plasma which is produced by thermal means such as convection, conduction and the like. It is believed that the activated plasma species are further energized by the electrical environment thereby accounting for the higher-than-theoretical yields which are produced, as hereinafter more fully illustrated.

As mentioned, the plasma must be formed by an electric arc discharge, which as used herein means that the nitrogen or oxygen gases may be passed through or in contact with an electric arc discharge to form plasma which is then contacted with the other reactant gas whereby it is also converted into the plasma state. Alternatively, both reactant gases may be formed into a plasma directly by passing each through an electric arc discharge either together or alone. A third alternative is to pass an inert gas such as argon through an electric arc discharge to form an inert plasma and then contact the oxygen and nitrogen with the inert plasma, whereby they are converted to the highly reactive and excited plasma state or form.

An additional important feature of the present invention is the discovery of how to recover the high yields, namely, by expansion and contact with cooled recycle gas. The resulting gaseous reaction mixture must be expanded at an expansion ratio of from 30:1 to 200:1 and the expansion must begin prior to the loss of the plasma state, i.e., while at least some plasma still exists. If the expansion is delayed until the plasma state has been completely dissipated and the gas is then cooled, the yield will be substantially lower than if the expansion had been initiated prior to the complete loss of the plasma state.

If the reaction gas is to be cooled in stages it is essential that the first stage expansion be no lower than 30:1 in order to "freeze out" the high yield. If lower ratios are used, then the cooling or quench rate will be too slow thus enabling the nitric oxide to dissociate during cooling.

BRIEF DESCRIPTION OF THE DRAWINGS

The invention and its many advantages may be further understood by reference to the following detailed description illustrated in the accompanying drawings, in which:

FIG. 2 is a schematic diagram of suitable apparatus for performing the present invention;

FIG. 3 is a sectional view of a plasma generator and nozzle;

FIG. 4 is an end view of the nozzle as viewed in the direction indicated by arrow A in FIG. 3.

DESCRIPTION OF THE PREFERRED EMBODIMENTS

Figure 1:
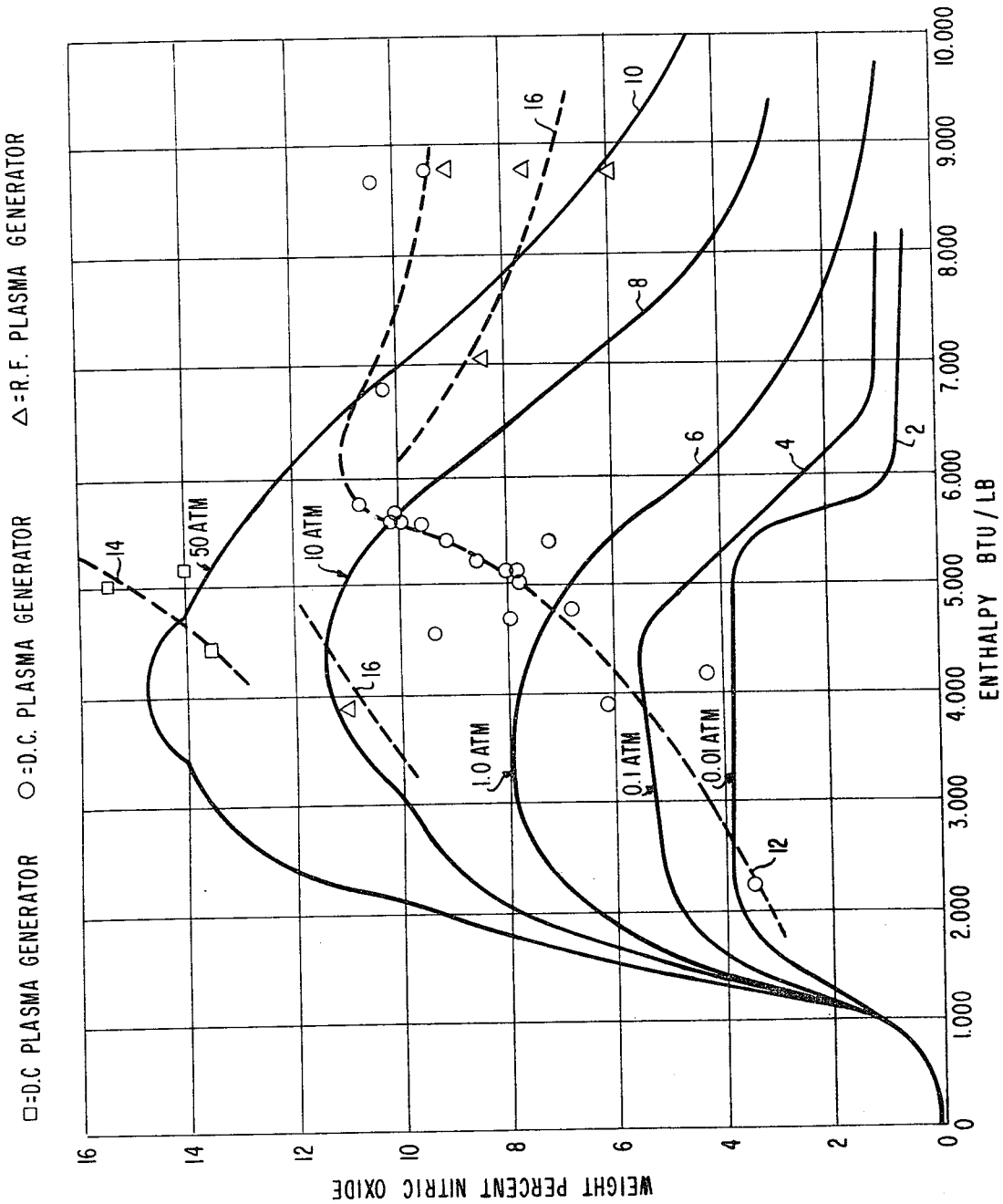
FIG. 1 is a graphical representation of weight percent of nitric oxide versus enthalpy for a nitrogen plasma generator system.

Referring to FIG. 1, the weight percent nitric oxide is based on the total weight of nitrogen introduced into the plasma generator. The enthalpy (B.t.u. per pound), which is sometimes hereinafter referred to as plasma generator enthalpy, is a measure of the energy content of the reactant and product gases essentially at the time of reaction thereof to form the nitric oxide as hereinafter more fully discussed. The solid curves on the graph designated at 2, 4, 6, 8 and 10, represent the calculated theoretical equilibrium yields or nitric oxide at various enthalpies in a (thermal) plasma generator system at a 1:1 oxygen to nitrogen mole feed ratio. These theoretical equilibrium yields are based on thermodynamic calculations as presented in the Technical Note 4265 by W. E. Moeckel and Kenneth C. Weston, National Advisory Committee for Aeronautics, Washington, D.C., published April 1958.

It will be noted that each of the solid curves represents a different pressure, which is the pressure of the plasma generator system.

From an inspection of the curves 4 and 6, it will be seen that at system pressures of from 0.1 atm. to 1.0 atm. the maximum theoretically predicted equilibrium nitric oxide yields are about 5 to 8 weight percent. As previously mentioned, actual yields recovered heretofore have been considerably lower, namely 2 to 4 weight percent.

The dotted curves designated as 12, 14 and 16 depict values of nitric oxide which may be recovered via the process of the present invention. The dotted curve 12 represents a series of four minute runs wherein nitrogen gas is subjected to a DC electric arc discharge to form a nitrogen plasma jet, which is reacted with oxygen (at least a portion of the oxygen being converted to plasma upon contact with the nitrogen plasma) at a 1:1 oxygen to nitrogen mole feed ratio and at a plasma generator system pressure of 0.53 atmosphere (i.e., the pressure immediately behind the arc). The dotted curve 14 represents the results of a series of one minute runs under the same conditions as the previously described tests. The dotted curve 16 defines the results of a series of four minute runs wherein premixed oxygen and nitrogen gases, at a 1:1 mole feed ratio, are subjected to a 4 mHz. radio frequency electric arc discharge. The pressrue immediately behind the arc region is one atmosphere.

As can be seen from the dotted curves 12, 14 and 16, the weight percent of nitric oxide recovered via the process of the present invention is frequently more than double the previously predicted maximum theoretical equilibrium yields and as much as six times or more greater than the actual yields recovered heretofore.

As previously mentioned, one feature of the present invention is the recognition or discovery that higher than thermodynamically predicted equilibrium yields (that is, calculated yields) of nitric oxide or what are sometimes hereinafter referred to as "non-equilibrium" yields of nitric oxide may be produced by way of an electric arc discharge process. An additional essential feature of the present invention, however, is the discovery of how to recover these high, e.g., from 8 to 50 weight percent, nitric oxide yields. In short, recovery of these high yields are achieved by cooling the resulting reaction mixture from the plasma state (in other words where at least a portion of the resulting reaction mixture is in the plasma state or form) to below the dissociation temperature of nitric oxide by expansion within the aforesaid range and contact with cooler recycle gas. Because kinetics control the reaction of nitrogen with oxygen, some of the nitric oxide is actually formed during the quenching due to statistics and the presence of free atoms.

As used herein, the dissociation temperature is the temperature below which no more than 10 weight percent of the oxide of nitrogen produced will be lost by dissociation in less than 3 to 5 minutes if left in a vessel by itself.

Referring to FIG. 2, suitable apparatus for carrying out the process of the present invention is schematically illustrated. The apparatus may include a plasma jet generator 20, a nozzle 22, a contacting chamber 24, a mixing chamber 26, a heat exchanger 28, and a recycle conduit 30. A conduit tee section 32 may be provided at the exit end of the heat exchanger 28 for dividing the resulting cooled product gas into two portions, one portion being recovered at the recovery point 34 and the other portion being recycled through the conduit 30 to the upstream contacting chamber 24. About 1 to 30 volumes, preferably about 2 to 20 volumes, and more preferably about 5 to 15 volumes, of product gas may be recycled back to the contacting chamber 24 for each volume of gas input to the plasma jet generator 20 (or gas recovered at the point 34 which is the same basis at a steady-state operation).

The term "gas input" is defined as the input of oxygen-containing gas and nitrogen-containing gas fed to the plasma jet generator 20. The temperature of the recycled gas fed to the contacting chamber is usually below 1000° C., preferably is below 100° C., and most preferably is below 60° C.

Still referring to FIG. 2, a vacuum pump 36 may be provided to establish the proper downstream pressure in the system. A second pump 38 may be provided along the conduit 30 for recycling of the product gas to the contacting zone 24. The heat exchanger 28 may be a single pass shell and tube heat exchanger provided with a shell inlet 40 and shell outlet 42 for circulation of a suitable coolant such as water. Other types of heat exchangers may be used. For a more detailed discussion of heat exchangers, see Perry's Chemical Engineers' Handbook, Section 11, pp. 2–24 (McGraw-Hill, 1963). It is possible to use such a conventional heat exchanger to cool the resultant gaseous reaction mixture to such low temperatures because of the effect of the cooler recycle gas which substantially lowers the temperature and velocity of the stream of expanded gaseous reaction mixture issuing from the nozzle 22. In fact, the high temperature high velocity stream of gas may be cooled and slowed down by contact with the cooler recycle gas such that shock waves may not occur. Shock waves are characterized by planes of gas at different rarefractions. In a typical shock wave or front, all of the energy is compressed into a very small area so that the pressure may actually be many times greater than desired. These uncontrolled shock waves can cause the dissociation of nitric oxide, thereby undesirably reducing the yield. The present invention, however, minimizes or entirely eliminates such uncontrolled shock waves.

As previously mentioned, the essence of the present invention whereby the unexpectedly high yields of nitric oxide may be obtained is the discovery that the reaction must be in the plasma state, that the plasma must be formed via an electric arc discharge, and that the resulting reaction mixture must be cooled from the plasma state, i.e., a temperature of about 4000° C. or higher, to below the dissociation temperature of nitric oxide by expanding at an expansion ratio of from 30:1 to 200:1 and contacting with cooled recycle gas. The expansion ratio is the ratio of the absolute gas pressure immediately behind the electric arc to the absolute pressure of the downstream end of the expansion zone. Preferably, the resulting initial gaseous reaction mixture is cooled by expansion and contact with recycle gas to below about 1000° C., more desirably below about 100° C., and most desirably below about 40° C.

For example, in order to achieve the desired cooling the gaseous reaction mixture may be expanded through the nozzle 22 at an expansion ratio of at least 30:1, and then be exhausted through the chamber 24 for contact with the cooler recycle gas and then into the mixing zone 26 whereby a substantially homogeneous mixture of initial and recycled gaseous mixtures is achieved. This homogeneous mixture may then be passed through the heat exchanger 28 for further cooling. Preferably, an overall expansion ratio of from above 30:1 to 200:1, and most preferably from 50:1 to 130:1, is used. The overall expansion ratio is the ratio of absolute gas pressure immediately behind the electric arc to the absolute pressure of the mixing chamber 26.

Referring to FIG. 3, a typical plasma jet generator 20 may comprise a cathode 44 which may be any consumable or non-consumable cathode conventionally used to produce an electric arc. Preferably a non-consumable cathode such as a 2 weight percent thoriated-tungsten cathode is employed. A cooling chamber 46 for circulation of a coolant such as water is provided in order to cool the cathode 44. The water is introduced into the cooling chamber via an inlet conduit 48 and removed via an outlet conduit 50.

A circular anode 52 is also provided. While the anode, like the cathode, may be any consumable or non-consumable material generally used by those skilled in the art, the anode is preferably a non-consumable copper anode with a tungsten insert. The anode may be cooled by the circulation of a coolant such as water in an anode cooling chamber 54.

Nitrogen-containing gas is introduced into the plasma jet generator via a conduit 56. While any nitrogen-containing gas may be used as a source of nitrogen, preferably, however, the other constituents of the gas are inert to the nitrogen-oxygen reaction. Generally, air and preferably pure nitrogen gas are employed.

As previously mentioned, the pressure of the gas immediately behind the electric arc is the "plasma generator system pressure." In connection with the plasma jet generator configuration shown in FIG. 3, the pressure of the nitrogen-containing gas immediately behind the arc is for all practical purpose essentially the same as the pressure at which the gas is introduced via the conduit 56.

Normally, the plasma jet generator is operated at a system pressure of at least 0.01 atm., and preferably at least 0.5 atm., e.g., 0.5 to 100 atm.

A voltage gradient is supplied from a suitable source across the cathode 44 and the anode 52 in order to provide an electric arc discharge. The nitrogen-containing gas is passed through the electric arc whereupon a plasma of nitrogen is formed, i.e., highly reactive and excited ionized and neutral species, the plasma taking the form of a jet in the opening or nozzle 22. Any convenient oxygen-containing gas such as air and preferably pure oxygen is introduced via a conduit 60 and is contacted with the nitrogen plasma in the nozzle 22 whereby oxygen plasma is formed. The nitrogen and oxygen react in the plasma state or condition to yield a nitric oxide-containing reaction mixture.

The total amounts of oxygen and nitrogen introduced into the plasma generator are controlled such that an oxygen to nitrogen mole ratio in the range of from about 0.8:1 to 2:1, and preferably from about 1:1 to 1.5:1, is obtained.

While FIG. 3 illustrates the introduction of oxygen after the formation of the nitrogen plasma, the oxygen may be introduced and mixed with the nitrogen, if desired, prior to or during the formation of the plasma in the arc region. It is preferred, however, when direct current arc systems are used. to introduce the oxygen into the nozzle 22 as shown in FIG. 3, in order to minimize oxidation of the electrodes. As previously mentioned, the oxygen and nitrogen plasma may be formed by contact with an inert plasma. For example an inert gas such as argon may be introduced via the conduit 56, formed into a plasma, and then contacted in nozzle 22 with nitrogen and oxygen introduced via conduit 60 so as to convert the nitrogen and oxygen into the plasma state.

In order to obtain the high yields of nitric oxide the plasma jet generator must be operated in an enthalpy of from about 800 to 10,000, preferably from about 2000 to 10,000 and more preferably from about 2000 to 6000, B.t.u.'s per pound. The enthalpy of a plasma generator is a measure of the energy content of the reactant and product gases essentially at the time of reaction. For example, in the apparatus of FIG. 3, the plasma generator enthalpy is that of the gases in the opening or nozzle 22. The plasma generator enthalpy is determined by the following formula:

$$\text{Enthalpy} = \frac{P_{elec.} \times P_{eff.} \times K}{\text{Gas Input}}$$

wherein $P_{elec.}$ is the electric power in kilowatts put into the electric arc discharge;

Peff. is the energy efficiency for the particular geometric configuration of the plasma generator and electrodes, Peff. being a dimensionless term equal to the applied energy divided by the output energy;

K is a conversion factor for kilowatt hours to B.t.u.; and

Gas Input is the input of nitrogen-containing gas and oxygen-containing gas in pounds per hour introduced via the conduits 56 and 60, respectively.

Any apparatus suitable for the production or generation of a plasma either by direct current energization or alternating current voltage energization, and preferably alternating current, may be used in the present invention.

Referring to FIGS. 3 and 4, the nozzle 22 is preferably of the convergent-divergent type in order to maximize the supersonic adiabatic expansion velocity of the gaseous reaction mixture and to obtain a substantially parallel shock-free stream. A shock-free stream is desired since, as discussed above, uncontrolled shock waves cause the dissociation of nitric oxide, thereby reducing the yield. Further, the nozzle 22 may have a plurality of finned surfaces 70 which extend the exterior surface area of the nozzle 22, thus increasing the rate of heat transfer per unit length of the nozzle and providing for the dissipation of any heat build-up in the nozzle itself. Convergent-divergent nozzles, per se, and their thermodynamics are well known to those skilled in fluid dynamics and for sake of brevity are not discussed further herein. For a more detailed explanation of convergent-divergent nozzles and the related thermodynamics considerations, see an article by Kuno Foelsch, entitled "The Analytical Design of an Axially Symmetric Laval Nozzle for a Parallel Uniform Jet," appearing in the March 1949 issue of the Journal of Aeronautical Sciences, and also see Perry's Chemical Engineers' Handbook, Section 5, pp. 26–27 (McGraw-Hill, 1963), both of which are incorporated herein by reference.

Figure 5:
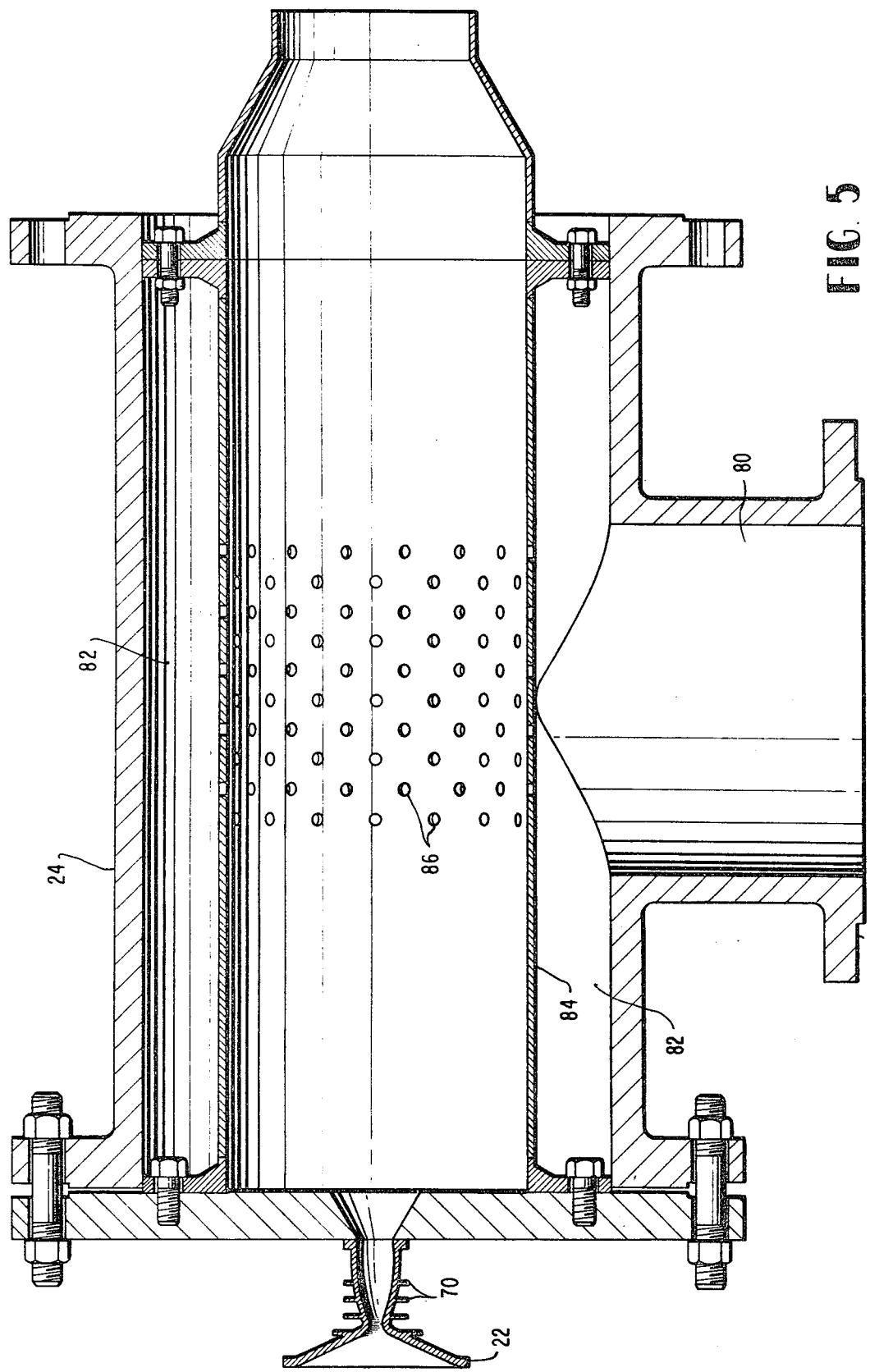
FIG. 5 is a partially sectional view of the nozzle and contacting chamber.

Turning now to FIG. 5, the contacting chamber 24 may comprise a recycle gas inlet 80 whereby cooler recycle gas is admitted to the annular space 82 surrounding the interior conduit 84 which connects the nozzle 22 with the mixing chamber 26. The interior conduit has a plurality of holes or perforations 86 through which the recycle gas passes into substantially radical contact with the high temperature high velocity stream of gas issuing from the nozzle 22. This stream of gas may have, for example, a speed of from Mach 2 to Mach 4 (2 to 4 times the speed of sound) and a temperature in the range of from 1000° C. to below 4000° C., although the high yield of nitric oxide has already been "frozen out," i.e., the reaction mixture has been quenched from plasma temperatures of at least 4000° C. The recycle gas then travels along with this stream into the mixing chamber 26 for homogeneous mixing as noted above.

While the preferred embodiment of the present invention has been described in connection with the production of nitric oxide, it is equally applicable to the production of other oxides of nitrogen such as nitrogen dioxide, as nitric oxide readily reacts with oxygen at atmospheric conditions to form nitrogen dioxide.

The process may be operated in any convenient manner such as batch, continuous or semi-continuous operations; however, it is preferred that a continuous operation be employed.

This invention is additionally illustrated by the following examples:

EXAMPLE I

The following run summarized in Table I, is illustrative of the present invention and uses the apparatus shown in FIGS. 2 to 5. Pure nitrogen and pure oxygen are used and each is introduced at a rate of about 8,800 cubic feet per hour (equal to about 320 pounds per hour of nitrogen and about 365 pounds per hour of oxygen). The plasma jet system pressure, i.e., the pressure of the nitrogen immediately behind the arc, is about 50 atm., and Peff. is about 60 percent.

The percent fixation is the weight percent of recovered nitric oxide, based on the weight of nitrogen introduced. The volume of the mixing chamber is 200 cubic feet.

TABLE I

Inlet gas to plasma jet generator: $N_2:O_2$ ratio of 1:1 (by volume)
Plasma jet generator pressure: 50 atm.
Power input to plasma jet generator: 1000 kw.
Nozzle exit pressure: 0.714 atm.
Gas enthalpy at nozzle exit: 3000 B.t.u./lb.
Gas temperature in plasma jet generator: 4150° C.
Gas temperature at nozzle exit: 2100° C.
Gas flow at nozzle exit: 0.19 lb./sec.
Mach number at nozzle exit: 3.2743 (9,503 ft./sec.)
Recycle gas entering mixing chamber:
  Temperature: 55° C.
  Pressure: 0.89 atm.
  Flow: 1.59 lb./sec.
  Volume ratio of recycle gas to input gas: 8.4:1
Overall expansion ratio: 70:1
Gas entering heat exchanger:
  Temperature: 725° C.
  Pressure: 0.714 atm.
  Flow: 1.78 lb./sec.
Heat exchanger coolant: water at 200 gal./min.
Gas leaving heat exchanger:
  Temperature: 18° C.
  Pressure: 0.592 atm.
  Flow: 1.78 lb./sec.
Recovered product (gas leaving vacuum pump):
  Temperature: 32° C.
  Pressure: 1.0 atm.
  Flow: 0.19 lb./sec.
  Wt. percent NO: 20
Percent fixation: 20 (by volume)

EXAMPLE II

The following runs shown in the Table II below were made in a plasma jet generator apparatus similar to that shown in FIG. 3. The runs were of one minute duration. Pure nitrogen and pure oxygen were used and each was introduced at a rate of 42.5 cubic feet per hour (equal to 3 pounds per hour of nitrogen and 3.5 pounds per hour of oxygen). The plasma jet system pressure, that is, the pressure of the nitrogen immediately behind the arc was 0.53 atm., and the Peff. was 79 percent.

The percent fixation is the weight percent of recovered nitric oxide, based on the weight of nitrogen introduced. The resulting nitric oxide-containing gas reaction mixture was expanded into a closed expansion chamber of 500 cubic feet and during the one minute run duration the pressure in the closed chamber varied by about 3 mm. Hg.

TABLE II
[Direct Current Energization]

| Run | Power Input, kw. | O/N mole ratio | Enthalpy, B.t.u./lb. | Expansion ratio | Percent fixation* |
|---|---|---|---|---|---|
| 1 | 13.3 | 1.16 | 5,050 | 760 | 3.2 |
| 2 | 13.3 | 1.16 | 5,050 | 141 | 9.3 |
| 3 | 13.3 | 1.16 | 5,050 | 79 | 15.5 |
| 4 | 13.3 | 1.16 | 5,050 | 51 | 5.6 |
| 5 | 12.8 | 1.01 | 5,180 | 871 | 5.5 |
| 6 | 12.8 | 1.01 | 5,180 | 150 | 14.1 |
| 7 | 12.8 | 1.01 | 5,180 | 78 | 10.6 |
| 8 | 12.8 | 1.01 | 5,180 | 50 | 9.9 |
| 9 | 13.2 | 1.37 | 4,540 | 775 | 8.2 |
| 10 | 13.2 | 1.37 | 4,540 | 117 | 13.5 |
| 11 | 13.2 | 1.37 | 4,540 | 52 | 12.8 |
| 12 | 13.2 | 1.37 | 4,540 | 43 | 10.7 |

*The terms "yield" and "percent fixation" are the same as used herein.

EXAMPLE III

The following runs shown in the Table III below were made in an apparatus using a radio frequency inductively coupled energization system and the runs were of four minutes duration. A 0.093" ID probe with an 0.010" orifice was used to sample the open gas stream at 1 atmosphere. The reaction mixture expanded into the probe wherein the pressure during the four minute runs were varied by about 10–23 mm. Hg. The nitrogen and oxygen flow rates were the same as those in Example II, the system pressure was 1 atmosphere and $P_{eff}$ was 50 percent.

TABLE III

[Direct Current Energization]

| Run | Power input, kw. | O/N mole ratio | Enthalpy, B.t.u./lb. | Expansion ratio | Percent fixation |
|---|---|---|---|---|---|
| 1 | 37.4 | .25 | 9,050 | 68 | 2.00 |
| 2 | 36.5 | 1.00 | 8,800 | 75 | 9.13 |
| 3 | 36.5 | 1.00 | 8,800 | 33 | 5.88 |
| 4 | 36.5 | 1.00 | 8,800 | 65 | 7.56 |
| 5 | 40.8 | 1.17 | 7,050 | 59 | 8.50 |
| 6 | 34.3 | 1.00 | 15,350 | 63 | 5.40 |
| 7 | 34.3 | .25 | 15,350 | 63 | 1.39 |
| 8 | 36.5 | 1.42 | 3,970 | 63 | 11.00 |

EXAMPLE IV

The following runs shown in Table IV below were made in a plasma jet generator apparatus (direct current energization) similar to that shown in FIG. 3 but were of one or more hours duration. Representative samples were taken after steady state conditions were reached as evidenced by constant pressure reading of the plasma jet and vacuum tank and a constant energy level.

Pure oxygen and nitrogen were used and each was introduced at a rate of from 42 to 63.5 cubic feet per minute (equal to a 1:1 oxygen to nitrogen mole feed ratio). The plasma jet pressure was one atmosphere and the $P_{eff}$ was 75 percent. The nitric oxide containing mixture was expanded to a 500 cubic foot tank (6' diameter x 20' long) with a 300 c.f.m. vacuum pump attached to the far end. Samples were taken at the vacuum pump inlet and analyzed. At the flow rates given above, the vacuum pump could provide, by throttling, various expansion ratios.

TABLE IV

| Run | Power input, kw. | Enthalpy, B.t.u./lb | Gas flow N₂ or O₂, l./min. | Expansion ratio | Jet efficiency, percent | Percent fixation |
|---|---|---|---|---|---|---|
| 1 | 4.50 | 856 | 30 | 60 | 55.0 | 0.60 |
| 2 | 5.50 | 1,519 | 30 | 58 | 79.8 | 1.90 |
| 3 | 7.00 | 1,742 | 30 | 60 | 72.0 | 3.20 |
| 4 | 9.55 | 2,079 | 30 | 60 | 63.0 | 7.15 |
| 5 | 12.50 | 2,128 | 30 | 94 | 49.4 | 6.36 |
| 6 | 9.30 | 2,251 | 30 | 68 | 70.0 | 7.40 |
| 7 | 12.75 | 2,300 | 20 | 65 | 52.3 | 7.40 |
| 8 | 14.80 | 2,640 | 30 | 86 | 51.7 | 8.50 |
| 9 | 13.50 | 2,690 | 20 | 72 | 58.0 | 8.25 |
| 10 | 12.00 | 2,861 | 30 | 66 | 69.0 | 9.20 |
| 11 | 15.50 | 3,154 | 30 | 88 | 59.0 | 9.27 |
| 12 | 16.90 | 3,639 | 30 | 98 | 62.4 | 10.30 |
| 13 | 17.80 | 4,368 | 30 | 77 | 71.0 | 10.90 |
| 14 | 20.70 | 4,610 | 20 | 83 | 64.5 | 10.00 |
| 15 | 28.10 | 4,960 | 30 | 120 | 51.4 | 12.73 |
| 16 | 26.90 | 5,020 | 30 | 108 | 54.0 | 12.45 |
| 17 | 21.00 | 5,081 | 30 | 79 | 70.0 | 12.00 |
| 18 | 23.00 | 5,248 | 30 | 77 | 66.0 | 12.45 |
| 19 | 27.10 | 5,320 | 30 | 125 | 56.7 | 13.70 |
| 20 | 17.61 | 5,490 | 20 | 74 | 60.2 | 12.68 |
| 21 | 18.68 | 5,570 | 30 | 115 | 57.7 | 14.05 |
| 22 | 18.52 | 5,580 | 20 | 88 | 58.2 | 13.50 |
| 23 | 18.00 | 5,650 | 20 | 67 | 60.5 | 12.80 |
| 24 | 18.90 | 6,030 | 20 | 113 | 64.1 | 14.40 |
| 25 | 18.85 | 6,230 | 20 | 72 | 64.5 | 11.20 |
| 26 | 18.30 | 6,240 | 20 | 99 | 65.6 | 14.02 |
| 27 | 18.20 | 6,540 | 20 | 95 | 67.3 | 13.00 |
| 28 | 19.00 | 7,500 | 20 | 103 | 76.1 | 14.18 |
| 29 | 29.00 | 7,518 | 30 | 92 | 75.0 | 13.00 |
| 30 | 35.00 | 8,531 | 30 | 142 | 73.0 | 12.30 |

EXAMPLE V

The following runs shown in Table V below were made in the same manner as the runs of Example IV.

TABLE V

| Run | Power input, kw. | Net enthalpy of gases, B.t.u./lb. | Gas flow l./min. N₂ | Gas flow l./min. O₂ | Expansion ratio | Jet efficiency, percent | Percent fixation |
|---|---|---|---|---|---|---|---|
| 1 | 12.0 | 3,317 | 30 | 30 | 4 | 80.0 | 3.08 |
| 2 | 12.0 | 3,317 | 30 | 30 | 13 | 80.0 | 4.00 |
| 3 | 11.7 | 3,525 | 30 | 30 | 21 | 87.2 | 5.03 |
| 4 | 11.7 | 3,525 | 30 | 30 | 36 | 87.2 | 7.65 |
| 5 | 11.7 | 3,525 | 30 | 30 | 40 | 87.2 | 8.24 |
| 6 | 12.0 | 3,317 | 30 | 30 | 45 | 80.0 | 8.10 |
| 7 | 12.0 | 3,317 | 30 | 30 | 55 | 80.0 | 9.51 |
| 8 | 12.0 | 2,861 | 30 | 30 | 66 | 69.0 | 9.20 |
| 9 | 13.5 | 2,690 | 20 | 20 | 72 | 58.0 | 8.25 |
| 10 | 14.8 | 2,640 | 30 | 30 | 86 | 51.7 | 8.50 |
| 11 | 15.5 | 3,154 | 30 | 30 | 88 | 59.0 | 9.27 |
| 12 | 16.9 | 3,639 | 30 | 30 | 98 | 62.4 | 10.30 |
| 13 | 11.7 | 3,525 | 30 | 30 | 100 | 87.2 | 9.77 |
| 14 | 15.6 | 4,390 | 30 | 30 | 6 | 81.4 | 3.74 |
| 15 | 15.6 | 4,390 | 30 | 30 | 31 | 81.4 | 7.24 |
| 16 | 15.6 | 4,314 | 30 | 30 | 34 | 80.0 | 8.21 |
| 17 | 16.2 | 4,695 | 30 | 30 | 39 | 82.4 | 9.06 |
| 18 | 16.2 | 4,695 | 30 | 30 | 48 | 82.4 | 10.20 |
| 19 | 15.6 | 4,390 | 30 | 30 | 55 | 81.4 | 10.55 |
| 20 | 15.1 | 4,314 | 30 | 30 | 64 | 80.0 | 10.25 |
| 21 | 15.6 | 4,314 | 30 | 30 | 70 | 80.0 | 11.01 |
| 22 | 17.8 | 4,338 | 30 | 30 | 77 | 71.0 | 10.90 |
| 23 | 15.1 | 4,314 | 30 | 30 | 80 | 80.0 | 11.05 |
| 24 | 16.2 | 4,695 | 30 | 30 | 88 | 82.4 | 11.42 |
| 25 | 16.2 | 4,695 | 30 | 30 | 100 | 82.4 | 11.48 |
| 26 | 18.0 | 5,322 | 30 | 30 | 8 | 85.5 | 4.40 |
| 27 | 21.0 | 5,973 | 30 | 30 | 10 | 82.3 | 3.65 |
| 28 | 21.0 | 5,973 | 30 | 30 | 20 | 82.3 | 4.91 |
| 29 | 18.0 | 5,239 | 30 | 30 | 32 | 82.7 | 7.64 |
| 30 | 21.0 | 5,973 | 30 | 30 | 33 | 82.3 | 6.65 |
| 31 | 18.0 | 5,322 | 30 | 30 | 44 | 85.5 | 7.33 |
| 32 | 17.4 | 5,029 | 30 | 30 | 49 | 82.1 | 8.18 |
| 33 | 19.5 | 5,482 | 30 | 30 | 66 | 82.8 | 10.90 |
| 34 | 21.0 | 5,973 | 30 | 30 | 71 | 82.3 | 10.40 |
| 35 | 17.6 | 5,490 | 20 | 20 | 74 | 60.2 | 12.68 |
| 36 | 23.0 | 5,248 | 30 | 30 | 77 | 66.0 | 12.45 |
| 37 | 21.0 | 5,081 | 30 | 30 | 79 | 70.0 | 12.00 |
| 38 | 17.4 | 5,029 | 30 | 30 | 85 | 82.1 | 12.04 |
| 39 | 18.5 | 5,580 | 20 | 20 | 88 | 58.2 | 13.50 |
| 40 | 18.0 | 5,239 | 30 | 30 | 104 | 82.7 | 12.27 |
| 41 | 18.0 | 5,322 | 30 | 30 | 105 | 85.5 | 12.10 |

The principle, preferred embodiment, and mode of operation of the present invention have been described in the foregoing specification. However, it should be understood that the invention which is intended to be protected herein may be practiced otherwise than as described without departing from the scope of the appended claims.

We claim:
1. A process for the production of nitric oxide, which process comprises:
   (a) introducing an oxygen-containing gas and a nitrogen-containing gas, at an oxygen to nitrogen mole ratio in the range of from about 0.8:1 to 2:1, into an electric arc plasma generator maintained at a pressure of at least 0.01 atm. to form oxygen plasma and nitrogen plasma,
   (b) reacting the oxygen plasma with the nitrogen plasma therein at a plasma generator enthalpy in the range of from about 800 to 10,000 B.t.u.'s per pound to yield a gaseous, nitric oxide-containing reaction mixture,
   (c) cooling the resulting gaseous mixture from the plasma state to a temperature below 100° C., the cooling of the resulting gaseous mixture comprising
      (i) substantially adiabatically expanding the resulting gaseous reaction mixture through a convergent-divergent nozzle at an expansion ratio of at least 30:1 to obtain a substantially parallel, shock-free stream of gaseous reaction mixture, the expansion beginning while at least a portion of the gaseous reaction mixture is still in the plasma state;
      (ii) contacting the stream with recycled gaseous reaction mixture, the temperature of the recycled reaction mixture being below 100° C., and the volume ratio of recycled reaction mixture to gas input to the generator being in the range of from 5:1 to 15:1;

(iii) passing the resulting stream to a mixing zone whereby a substantially homogeneous mixture of initial and recycled gaseous reaction mixtures is formed, (iv) passing the resulting homogeneous mixture through a heat exchanger for further cooling, (d) recycling a portion of the resulting cooled gaseous product in the said volume ratio to the upstream location for the contacting step (ii); and (e) recovering the remaining cooled gaseous product.

2. A process for the production of nitric oxide, which process comprises:

(a) introducing an oxygen-containing gas and a nitrogen-containing gas, at an oxygen to nitrogen mole ratio in the range of from about 0.8:1 to 2:1, into an electric arc plasma generator maintained at a pressure of at least 0.01 atm. to form oxygen plasma and nitrogen plasma, (b) reacting the oxygen plasma with the nitrogen plasma therein at a plasma generator enthalpy in the range of from about 2000 to 6000 B.t.u.'s per pound to yield a gaseous, nitric oxide-containing reaction mixture in the plasma state, (c) cooling the resulting gaseous mixture from the plasma state to a temperature below 60° C., the cooling of the resulting gaseous mixture comprising:

(i) substantially adiabatically expanding the resulting gaseous reaction mixture through a convergent-divergent nozzle at an expansion ratio of at least 30:1 to obtain a substantially parallel, shock-free stream of gaseous reaction mixture, the expansion beginning while at least a portion of the gaseous reaction mixture is still in the plasma state;

(ii) contacting the stream with recycled gaseous reaction mixture, the temperature of the recycled reaction mixture being below 100° C., and the volume ratio of recycled reaction mixture to gas input to the generator being in the range of from 5:1 to 15:1;

(iii) passing the resulting stream to a mixing zone whereby a substantially homogeneous mixture of initial and recycled gaseous reaction mixtures is formed, (iv) passing the resulting homogeneous mixture through a heat exchanger for further cooling, (d) recycling a portion of the resulting cooled gaseous product in the said volume ratio to upstream location for the contacting step (ii); and (e) recovering the remaining cooled gaseous product.

References Cited

UNITED STATES PATENTS

| | | | |
|---|---|---|---|
| 2,832,655 | 4/1958 | Hertzberg et al. | 23—163 X |
| 2,642,338 | 6/1953 | Pike | 23—163 |

OTHER REFERENCES

Marynowski, C. W., et al.; "Industrial and Eng. Chem. Fundamentals;" vol. 1, No. 1; February 1962; pp. 52–54 and 59.

Hellund, E. J.; The Plasma State; Reinhold Publishing Corp.; New York, 1961; pp. 88–90.

OSCAR R. VERTIZ, Primary Examiner

G. O. PETERS, Assistant Examiner

U.S. Cl. X.R.

204—179